Patented Dec. 11, 1951

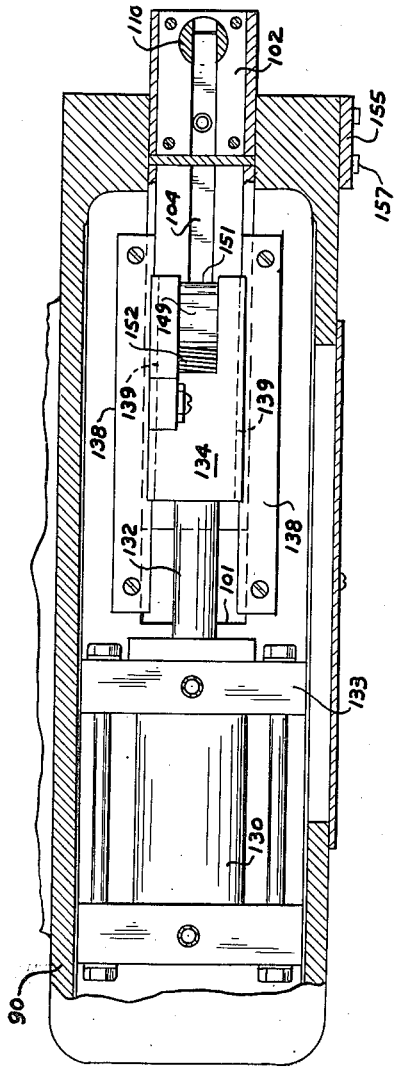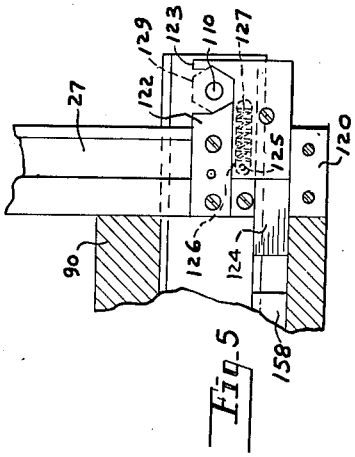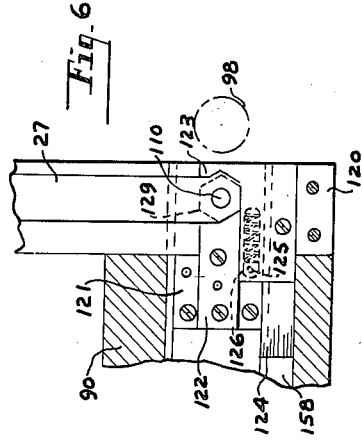

2,577,946

UNITED STATES PATENT OFFICE 2,577,946

INJECTOR MECHANISM

Roy W. Bailey and John Thomas Faull, Detroit, Mich., assignors to Detroit Power Screwdriver Company, Detroit, Mich., a corporation of Michigan Application September 7, 1950, Serial No. 183,638

10 Claims. (Cl. 10—162)

The present invention pertains to a novel injection mechanism for inserting a part such as a nut into a driving member such as a bit or wrench. Machines for injecting and driving nuts in this manner are shown in our U. S. Patent No. 2,509,123 of May 23, 1950 and in our co-pending application Serial No. 102,343, filed June 30, 1949. This application is a continuation-in-part of the co-pending application, and reference to both disclosures may be made for a more detailed understanding of the construction and operation of the entire machine.

The general object of the present invention is to provide a simpler means of operating the injector. The injector assembly, in all cases, includes a slide carrying a pair of jaws which receive the part to be injected into the bit or wrench. It will be assumed that this part is a nut. The slide is actuated to bring the nut into alinement with the bit, and the nut is then injected into the bit. For this operation a rocker arm is actuated against a slidable injector pin which transfers the nut to the bit. Thus, there are two movements in the operation of the injector assembly, namely, the displacement of the slide and next the actuation of the rocker arm. In the aforementioned patent these movements are accomplished by two cams and in the co-pending application by a fluid cylinder and an electro-magnet.

In the present invention the slide and rocker arm are actuated by simpler means. A fluid cylinder displaces a block which in turn is connected non-rigidly to the slide to allow relative movement between these parts although the block moves the slide in both directions. The block carries a cam which operates the rocker arm when the block and slide have reached their fully advanced position.

Another object of the invention is to provide resiliency in the movement of the slide and cam to avoid breakage of parts if the apparatus becomes blocked, as by a nut remaining in the bit or by an over-thickness nut finding its way to the jaws. In the case of the slide, the latter is driven from the block through a coil spring. Similarly, the block actuates the cam through a coil spring. In either case an obstruction in the machine merely causes compression of one spring or the other without breaking any of the machine parts.

The invention is fully disclosed by way of example in the following description and in the accompanying drawings in which:

Figure 3 is a section on the line 3—3 of Figure 1;

Figure 4 is a detail side elevation;

Figure 5 is a section on the line 5—5 of Figure 1, and

Figure 6 is a similar view in the retracted position of the slide.

Reference to these views will now be made by use of like characters which are employed to designate corresponding parts throughout.

Figure 1:
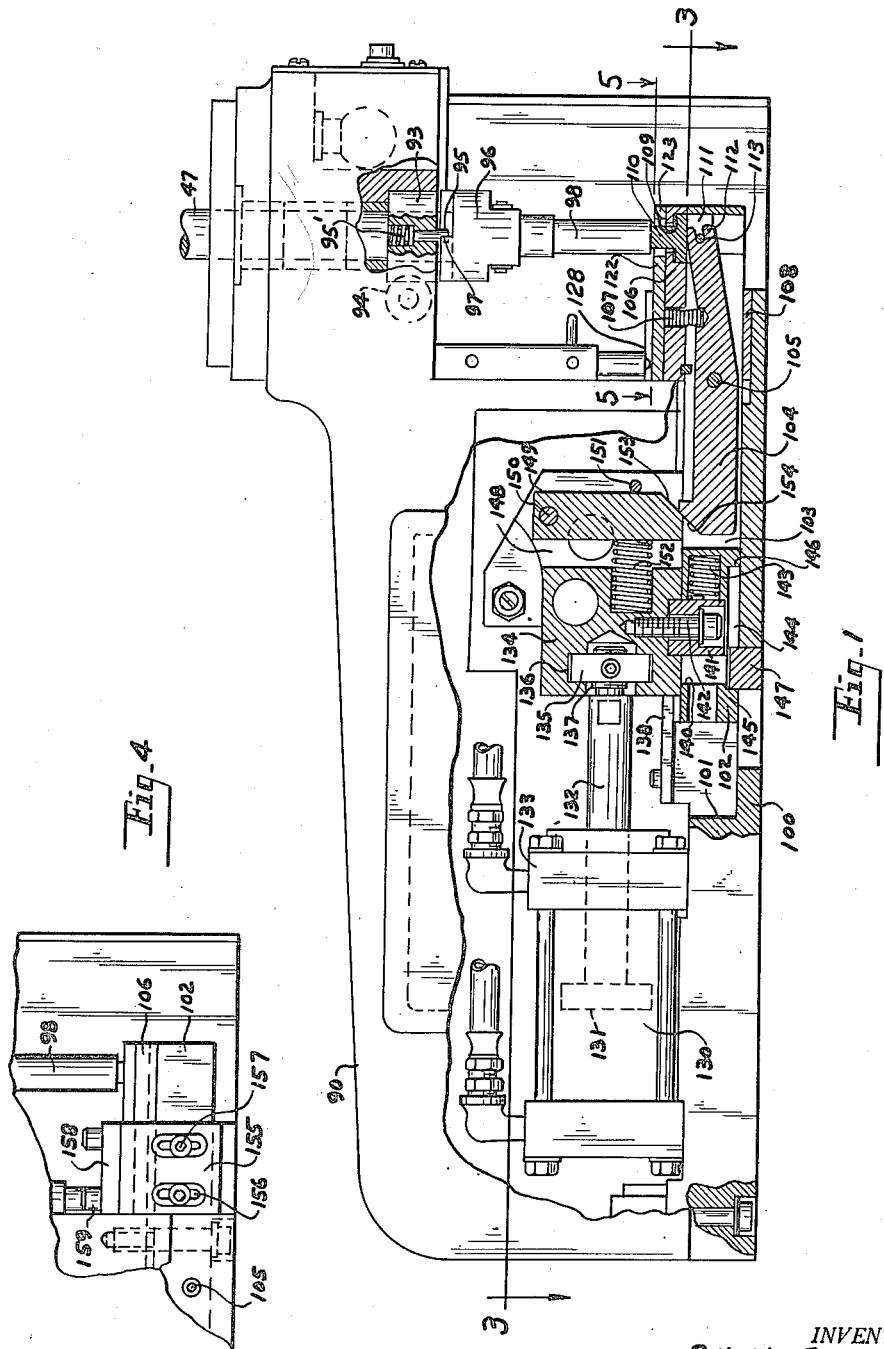
Figure 1 is a longitudinal section, partly in elevation, of the injection mechanism.
Figure 2:
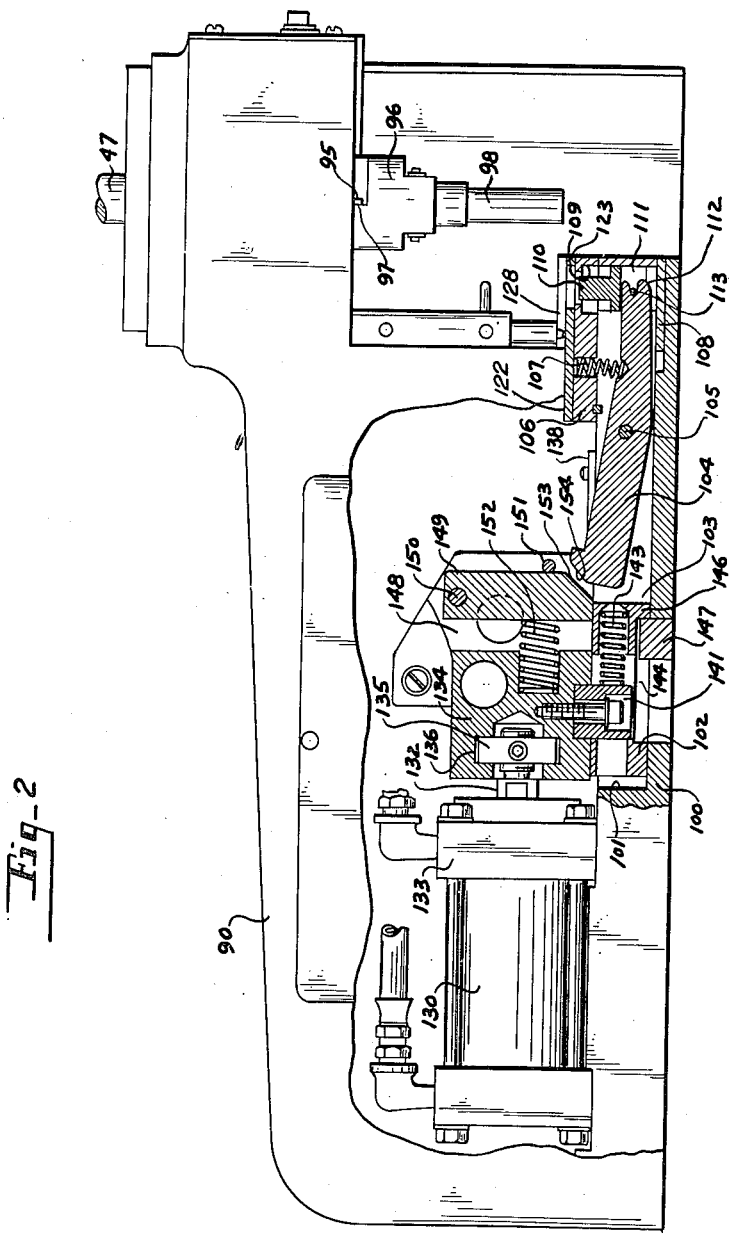
Figure 2 is a similar view showing the slide retracted.

A housing 90 is mounted to extend laterally from the column of a machine and over the table thereof as shown in the aforementioned disclosures. A spindle 47 is mounted for vertical sliding movement in one end of the housing and carries at one end a friction clutch 96 as in the co-pending application. From the clutch hangs a bit or wrench 98 adapted to receive a nut or other part which is to be assembled on a work piece. A track 27 delivers the nuts to mechanism within the housing 90, and this mechanism inserts the nut in the bit 98 as will presently be shown.

The spindle 47 is surrounded by a collar 93 which is held by a lock plug 94. In the collar is slidably mounted a positioning pin 95 backed by a spring 95' and adapted to be engaged by a stop shoulder 97 on the clutch housing 96. The pin thus assures a constant stop position for the bit 98 when being loaded.

The floor 100 of the housing 90 is formed with a longitudinal recess 101 in which is mounted a slide 102. The slide is also formed with a longitudinal slot 103 in which is mounted an injector lever 104, in the nature of a rocker arm, on a pivot pin 105. A guide plate 106 is fastened upon the slide over the forward end of the lever 104. An interposed coil spring 107 tends to hold this end downward. Beneath this end is a removable wear plate 108 fastened to the floor 100.

The guide plate 106 is formed with a shouldered opening 109 in which is slidably mounted a shouldered injector pin 110. Beneath the plate 106 the pin 110 is slotted at 111 to receive the forward end of the lever 104. This end of the lever is forked at 112 to receive a cross pin 113 that bridges the slot 111.

To the housing 90 is secured a vertical mounting block 120 opposite the discharge end of the track 27, which lies somewhat rearward of the spindle 47, for a purpose that will presently appear. On the plate 106 is located and secured a mounting plate 121 for a longitudinally extending jaw 122 fastened to the plate 106 and adapted to traverse the discharge end of the track on movement of the slide 102. A complementary jaw 123 opposing the jaw 122 is independently mounted and carries a finger 124 lying parallel to the slide 102. The jaw 123 also carries a pin 125 extending into a slot 126 cut lengthwise in the plate 121. A coil spring 127 bears against the pin 125 at one end of the slot and tends to move the jaw 123 toward the jaw 122. A retaining plate 128 secured horizontally on the upper end of the block 120 holds down the finger 124. The plate 121 is also formed with a hole 129 that registers with the hole 109 for the injector pin 110.

For actuating the slide 102, a cylinder 130 is mounted on the floor 100 behind the cavity 101. The cylinder contains a horizontally movable piston 131 from which a piston rod 132 extends through the forward head 133.

A slide block 134 is attached to the piston rod by means of a nut 135 inserted in a slot 136 in the block and screwed on a threaded end 137 of the piston rod. Gibs 138 are mounted on the floor of the housing 90 along the edges of the slot 101 and extend into slots 139 along the lower edges of the block 134 for supporting and guiding the latter.

The slide 102 is formed with a vertical recess 140 behind the slot 103. In this recess is mounted, with considerable lengthwise play, a coupling plug 141 fastened to the underside of the block 134 by a screw 142. The forward side of the plug 141 is engaged by a coil spring 143 lying and seated lengthwise in the slide. In the bottom of the slide 102 is cut a lengthwise slot that forms a rear shoulder 145 and a forward shoulder 146 at opposite sides of the plug 141. The slide is limited in its forward movement by engagement of the shoulder 145 with a stop 147 in the floor 100 and is limited in its rearward movement by engagement of the shoulder 146 with the stop 147.

The forward end of the block 134 is formed with a vertical slot 148 in which is pivotally suspended a cam 149 by a cross pin 150 at is upper end. The cam bears forwardly against a cross pin 151 under the action of a coil spring 152 seated lengthwise in the block 134. The inclined cam surface 153 of the member 149 rises on a similar complementary surface 154 on the rear end of the rocker arm 104.

The jaw members 122 and 123 are replaceable in various thicknesses for various sizes of nuts. The structure for holding down and guiding the jaw 122 is comprised of side plates or gibs 155 slotted vertically at 156 and fastened by bolts 157 to the sides of the housing 90, with a cross plate 158 secured upon their upper ends by bolts 159 and engaging the upper surface of the plate 122.

In the operation of the device, the block 154 and slide 102 in retracted position bring the jaws 122 and 123 in line with the track 27 to receive a nut therefrom, as shown in Figure 6. It will be seen that the track lies rearwardly and laterally of the bit 98.

As the block 134 is advanced by pressure in the cylinder 130, the spring 143 is compressed by the plug 141 until it has sufficient rigidity to move the slide 102 or until the plug engages the forward end of the opening 140. The slide is thus advanced with the plug 134, and the rocker arm 104 moves along with the slide until the shoulder 145 engages the stop 147. However, there is relative movement between the block 134 and the rocker arm because of the play of the plug 141 in the recess 140 and the compression of the spring 143. The spring 152 holds the cam 149 against the pin 151 and causes the cam surface 153 to ride on the surface 154. The forward end of the rocker arm 104 is thereby lifted, raising the injector pin 110 and transferring the nut from the jaws into the bit 98. The pressure in the cylinder 130 is now reversed to retract the slide and the jaws and the loaded bit 98 is brought down to the work as described in the aforementioned patent and application.

If the normal forward movement of the slide is obstructed the continuing forward movement of the plug 141 will be taken up by compression of the spring 143. In such case, or if the normal rocking of the arm 104 is obstructed, the continuing forward movement of the cam 149 will be taken up by compression of the spring 152, so that a breakage of parts is avoided in each case.

It will be noted that the injector pin 110 should not rise until the end of the forward stroke. The cam surface 154 is somewhat ahead of the surface 153 until the end of the stroke because of the clearance of the plug 141 in the opening 140 and the resulting incomplete compression of the spring 143 until the slide has nearly completed its forward stroke. As the stroke is completed the cam 149 rides up on the surface 154 and rocks the arm 104.

The spring 152 performs the additional functioning of accommodating a range of thicknesses of work pieces to be ejected from the jaws 122, 123. It is evident that the stroke of the injector pin 110 must be longer for greater thicknesses of work pieces. In a given size of machine, a given spring 152 is suitable for nuts or other work pieces varying in thickness from $\frac{1}{8}''$ to $\frac{7}{16}''$. In other words, a $\frac{7}{16}''$ piece can be thrown out of the jaws with this spring. With a thinner piece between the jaws, the stroke of the pin 110 is shorter, and the difference in movement is taken up by compression of the spring 152. In this connection it will be understood that the upward stroke of the pin 110 is stopped by the seating of the work piece in the bit 98. The stroke of the block 134, however, is constant, and the spring 152 compresses against the arrested cam 149.

Although a specific embodiment of the invention has been illustrated and described, it will be understood that various alterations in the details of construction may be made without departing from the scope of the invention as indicated by the appended claims.

What we claim is:

1. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, said drive means being yieldable in the forward movement of said block whereby to permit some additional forward movement of the block after the forward motion of said slide has been stopped by said limiting means, and a cam carried by said block and adapted to exert pressure on the remaining end of said rocker arm on forward movement of said block.

2. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, said drive means having clearance in said slide in the direction of slide movement, and a cam carried by said block and adapted to exert pressure on the remaining end of said rocker arm on forward movement of said block.

3. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, a compressible spring between said drive means and said slide on the forward side of said means, and a cam carried by said block and adapted to exert pressure on the remaining end of said rocker arm on forward movement of said block.

4. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, said drive means having clearance in said slide in the direction of slide movement, a compressible spring between said drive means and said slide on the forward side of said means, and a cam carried by said block and adapted to exert pressure on the remaining end of said rocker arm on forward movement of said block.

5. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, said drive means being yieldable in the forward movement of said block whereby to permit some additional forward movement of the block after the forward motion of said slide has been stopped by said limiting means, a cam carried by said block and adapted to exert pressure on the remaining end of said rocker arm on forward movement of said block, said cam being movable in said block in the direction of slide travel, and a spring in block and cam and compressible in the forward direction of slide travel.

6. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, said drive means having clearance in said slide in the direction of slide movement, a cam carried by said block and adapted to exert pressure on the remaining end of said rocker arm on forward movement of said block, said cam being yieldably mounted in said block.

7. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, a compressible spring between said drive means and said slide on the forward side of said means, a cam carried by said block and adapted to exert pressure on the remaining end of said rocker arm on forward movement of said block, said cam being yieldably mounted in said block.

8. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, drive means carried by said block for engaging said slide in both directions of travel, limiting means for the movement of said slide in both directions, said drive means having clearance in said slide in the direction of slide movement, a compressible spring between said drive means and said slide on the forward side of same means, a cam carried by said block and adapted to exert pressure on the remaining end of said rocker arm on forward movement of said block, said cam being yieldably mounted in said block.

9. An injector mechanism comprising a housing, said drive means being yieldable in the forward movement of said block whereby to permit some additional forward movement of the block after the forward motion of said slide has been stopped by said limiting means, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, said slide having an opening, a plug extending from said block into said opening with lengthwise clearance therein and adapted to engage the ends of said opening to drive said slide in either direction, a compressible spring between said plug and said slide on the forward side of said plug, and a cam carried by said block and adapted to exert pressure on the remaining end of said rocker arm on forward movement of said block.

10. An injector mechanism comprising a housing, a slide therein, a pair of spaced jaws carried by said slide for receiving a work piece, a rocker arm pivotally mounted on said slide and having its forward end disposed in line with the space between said jaws, means on said end adapted to eject a piece from said jaws, a block slidably mounted in said housing at said slide, means for oscillating said block, said slide having an opening, a plug extending from said block into said opening with lengthwise clearance therein and adapted to engage the ends of said opening to drive said slide in either direction, a compressible spring between said plug and said slide on the forward side of said plug, a cam carried by said block and adapted to exert pressure on the remaining end of said rocker arm on forward movement of said block, said cam being yieldably mounted in said block.

ROY W. BAILEY.
JOHN THOMAS FAULL.

REFERENCES CITED

The following references are of record in the file of this patent:

UNITED STATES PATENTS

| Number | Name | Date |
|---|---|---|
| 722,479 | Berger | Mar. 10, 1903 |
| 2,385,521 | Mead | Sept. 25, 1945 |
| 2,509,123 | Bailey | May 23, 1950 |